Dec. 13, 1932.    R. W. STIPES ET AL    1,890,918
AUTOMOBILE DECKING DEVICE
Filed July 12, 1928

INVENTOR
REESE W. STIPES
AND WILLIAM M. HOOSE.
ATTORNEY.

Patented Dec. 13, 1932

1,890,918

UNITED STATES PATENT OFFICE

REESE W. STIPES AND WILLIAM M. HOOSE, OF DETROIT, MICHIGAN, ASSIGNORS, BY DIRECT AND MESNE ASSIGNMENTS, OF ONE-THIRD TO THE EVANS AUTO LOADING COMPANY, INC., OF DETROIT, MICHIGAN, A CORPORATION OF DELAWARE, OF ONE-THIRD TO COPONY AUTO LOADING COMPANY, OF DETROIT, MICHIGAN, A CORPORATION OF MICHIGAN, AND ONE-THIRD TO THE STUDEBAKER CORPORATION, OF SOUTH BEND, INDIANA, A CORPORATION OF NEW JERSEY

AUTOMOBILE DECKING DEVICE

Application filed July 12, 1928. Serial No. 292,288.

This invention relates to a decking system for loading automobiles or the like and relates particularly to a simple construction for supporting a motor vehicle in raised position in a freight car or other conveyance so as to provide room beneath the vehicle for another vehicle.

It is an important object of the invention to provide an inexpensive structure which comprises a hub engaging member supported by a single vertical member extending from the floor of the conveyance and cooperating brace members extending from the hub engaging member to the side of the conveyance.

Another object of the invention is to provide an adjustment between the brace members and the hub engaging member to compensate for the different widths of conveyances in which the vehicles are to be decked.

Other objects and advantages of the invention will more fully appear from the following description taken in connection with the accompanying drawing, in which:

Fig. 1 is a longitudinal sectional view through a freight car in which a support is shown in side elevation with one end of a vehicle in raised position on the support.

Fig. 2 is a vertical transverse section through the freight car on line 2—2 of Fig. 1.

Fig. 3 is a perspective of the support, parts being broken away and in section.

Fig. 4 is a sectional view through the hub engaging member.

Referring to the drawing wherein we have illustrated one embodiment of our invention, a freight car having a floor 10 and side walls 12 is provided with two automobiles 14 and 16. The one automobile 16 has its rear wheels 18 blocked to the floor as at 20 and its front wheels 22 are raised above the automobile 14, the hubs of which are supported in our improved device.

While various methods and means have been employed for supporting one automobile above another with sufficient space between the supports for the lower automobile, the present invention contemplates an improved device wherein a single vertical member supports each hub and lateral braces, adjustable with respect to the vertical member, are used to brace the upper end of the vertical member.

In detail the support for one end of an automobile comprises spaced vertical members 24 extending upwardly and perpendicular to the floor 10. The vertical members are spaced apart a distance greater than the width of an automobile. The lower end of each vertical member 24 is provided with angle plates 26 secured to the opposite sides thereof which may be secured to the floor 10 as by nails 28. The upper end of each vertical member 24 is provided with a top plate 30 having lateral gussets 32 secured to the sides of the vertical member and projects inwardly therefrom toward the automobile to be carried, the gussets forming a supporting means for the inner end of the plate. The inner end of the plate 30 has a portion thereof pressed downwardly to receive the hub of the automobile, the portion 34 of the plate forming an abutment for the outer end of the hub. In the form illustrated the recess is formed by a semi-cylindrical member 35 set into a cut out portion and secured to the remaining edges of the plate or if desired to the side gussets 32. As shown in Fig. 4, a wire may be looped around the automobile hub and the semi-cylindrical member 35 to hold the hub within the depression.

To support the vertical member longitudinally and transversely of the conveyance we have provided an adjustable brace adapted to be adjustably secured to the upper end of the vertical member and its plate 30 and secured to the side of the conveyance on a horizontal line with the upper end of the vertical member or opposite the hub which is supported.

The preferred form of the brace member comprises an A shaped bracket having two oppositely diverging angle bars 36. The opposite end of each angle bar is bent, one end to be parallel with the side of the conveyance and the other end to be at right angles thereto or parallel with the gusset plate 32. Adjacent the outer ends of the angles 36 we have provided a brace member 38 which stiffens the assembly and holds the angles 36 in proper position for securing them to the side of the conveyance.

A pair of spaced parallel plates 40 is secured to the brace member 38 as at 42, and to the inner ends of the angles as at 44. A plurality of openings are provided in the plates 40 to receive bolts 46 which extend through the gussets; one of which extends through the upper end of the vertical member and the gussets. The bolts 46 may be removed and the vertical member 30 and gussets 32 positioned relative to the A shaped bracket, thereby retaining the vertical supporting member as close to the axle as possible regardless of the width of the freight car. It will be understood that the vertical supporting member is always the same distance from the axle regardless of the width of the freight car.

It will be understood that we have provided two main assemblies which may be taken apart for convenience in shipment and adjusted with respect to each other. The entire support is made up of a minimum number of parts thereby reducing the cost and the device is equally as strong as other constructions wherein many more parts are used. The two parts when not in use may be taken apart and laid out flat so that the apparatus may be returned to the shipper after a vehicle has reached its destination and may be repeatedly used.

While we have described what we deem to be the preferred embodiment of our invention it will be obvious that various changes including the size and arrangement of parts may be made without departing from the spirit of our invention and it is not our intention to limit its scope other than by the terms of the appended claims.

What we claim is:

1. A motor vehicle decking apparatus comprising a horizontal plate adapted to receive a hub of an automobile, a vertical supporting member engaging the under surface of said plate, and triangular bracing means on a horizontal line with the plane of said plate adapted to be secured to the side walls of a freight car.

2. A motor vehicle decking apparatus, comprising a horizontal plate adapted to receive a hub of an automobile, a vertical supporting member engaging the under surface of said plate, and triangular bracing means adjustable with respect to said plate and its support and on a horizontal line with said plate adapted to be secured to the side walls of a freight car.

3. A motor vehicle decking apparatus, comprising a plate, a portion on said plate adapted to receive a hub of an automobile, lateral gussets on said plate, a vertical supporting member between the gussets of said plate and spaced from said hub engaging portion, and a pair of diverging brace members extending from said plate and its support adapted to be secured to the side walls of a freight car.

4. A motor vehicle decking apparatus comprising a plate adapted to receive a hub of an automobile, lateral gussets on said plate, a vertical supporting member secured to and between said gussets, a pair of diverging members, a brace for the outer ends of said members, a pair of spaced parallel plates extending from said brace to the inner ends of said diverging members, and means for securing said last named plates to said first named plate.

5. A motor vehicle decking apparatus comprising a plate adapted to receive a hub of an automobile, lateral gussets on said plate, a vertical supporting member secured to and between said gussets, a pair of diverging members, a brace for the outer ends of said members, a pair of spaced parallel plates extending from said brace to the inner ends of said diverging members, and means for adjustably securing said last named plates to said first named plate.

6. The combination with a freight car, of means for suspending an automobile therein, comprising a vertical supporting member, a hub engaging portion extending inwardly from the vertical supporting member, and means for bracing the vertical supporting member transversely and longitudinally of the freight car, said vertical supporting member and the hub engaging member being adjustable as a unit relative to said bracing means.

7. The combination with a freight car, of means for suspending an automobile therein, comprising parallel vertical supporting members spaced from the side walls of the freight car and spaced apart throughout their length a distance greater than the width of an automobile to permit an automobile to be received therebetween, and means for bracing the upper end of the vertical supporting members transversely and longitudinally of the freight car.

8. The combination with a freight car, of means for suspending an automobile therein, comprising parallel vertical supporting members spaced from the side walls of the freight car and spaced apart throughout their length a distance greater than the width of an automobile to permit an automobile to be received therebetween, a hub engaging portion extending inwardly from the vertical supporting members, and means for bracing the vertical supporting members transversely and longitudinally of the freight car.

9. The combination with a freight car, of means for suspending an automobile therein, comprising parallel vertical supporting members spaced from the side walls of a freight car and spaced throughout their length from each other a distance greater than the width of an automobile to receive an automobile therebetween, and adjustable means for bracing the vertical supporting members transversely and longitudinally of the freight car.

10. The combination with a freight car, of means for suspending an automobile therein, comprising parallel vertical supporting members spaced from the sides of a freight car and from each other a distance greater than the width of an automobile to permit vertical movement of an automobile therebetween, transverse bracing members for said vertical members, and means permitting transverse adjustment of said vertical members relative to their bracing members.

REESE W. STIPES.
WILLIAM M. HOOSE.